Feb. 23, 1943.  F. B. PORTER  2,311,691
AUTOMATIC POWER TRANSMISSION
Filed June 28, 1941  4 Sheets-Sheet 2

INVENTOR
*Frederick B. Porter*
BY *Francis H. Vanderwerker*

ATTORNEY

Feb. 23, 1943.　　　　F. B. PORTER　　　　2,311,691
AUTOMATIC POWER TRANSMISSION
Filed June 28, 1941　　　　4 Sheets-Sheet 4

INVENTOR
Frederick B. Porter
BY Francis H. Vanderwerker
ATTORNEY

Patented Feb. 23, 1943

2,311,691

UNITED STATES PATENT OFFICE 2,311,691

AUTOMATIC POWER TRANSMISSION

Frederick Brenton Porter, United States Army, Fort Bragg, N. C.

Application June 28, 1941, Serial No. 400,194

25 Claims. (Cl. 74—293)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to improvements in power transmissions, particularly adapted for use in automotive vehicles, but applicable to practically any type of equipment in which an automatic variable speed drive is required.

One of the objects of the invention is to provide a continuous gear type automatic variable transmission for automotive vehicles, wherein an infinite number of gear ratios are obtained for varying the speed between a power driving shaft of an engine and a driven shaft and wherein means are provided for causing the instant gear ratio at any time to be the ratio permitted by the torque delivered by the engine, thus permitting the engine to operate at its maximum efficiency.

Another object of the invention is to provide a continuous automatic transmission employing gearing, wherein the combination of a differential gear drive mechanism, a planetary gear assembly unit controlled by a fluid controlled mechanism and a free wheeling unit is provided for obtaining an infinite number of gear ratios, to produce all possible variations in speed between a driving shaft and a driven shaft.

Other objects of the invention are to provide a continuous automatic power transmission, which is of a simple and compact structure comprised essentially of few parts, which may be quickly manufactured by simple and direct processes, which does not require constant adjustment of the several parts and in which the several parts have ample and properly located bearings which are arranged with respect to one another for receiving, distributing and balancing thrusts and other stresses.

With the above and other objects and advantages in view, the invention consists of certain features of construction and operation of parts which will hereinafter appear and in which—

Referring more particularly to the drawings, A indicates generally the improved automatic variable transmission including a differential gear drive assembly B, a planetary gear assembly C, a fluid displacing mechanism D, and a free wheeling unit E, which are adapted to produce all possible variations in speed between a driving shaft 1 and a driven shaft 2. The transmission A which also includes a direction changing mechanism F is mounted in a housing G, having end walls 3 and 4, a bottom wall 5 and a top cover plate 6, which may be removed for inspection of the interior of the housing. An oil sump or basin 7 is formed in the lower portion of the housing G.

Figure 1:
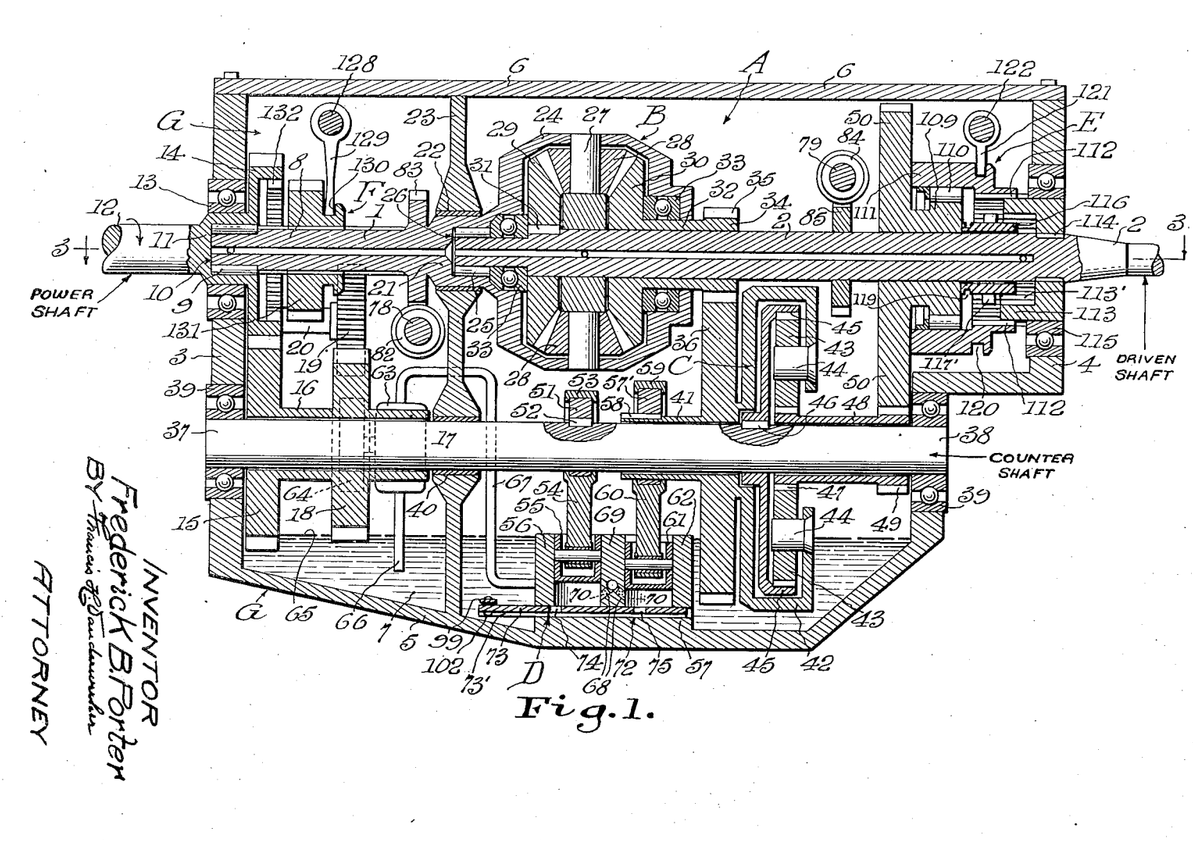
Fig. 1 is a longitudinal sectional view, through the improved power transmission and a housing therefor.
Figure 3:
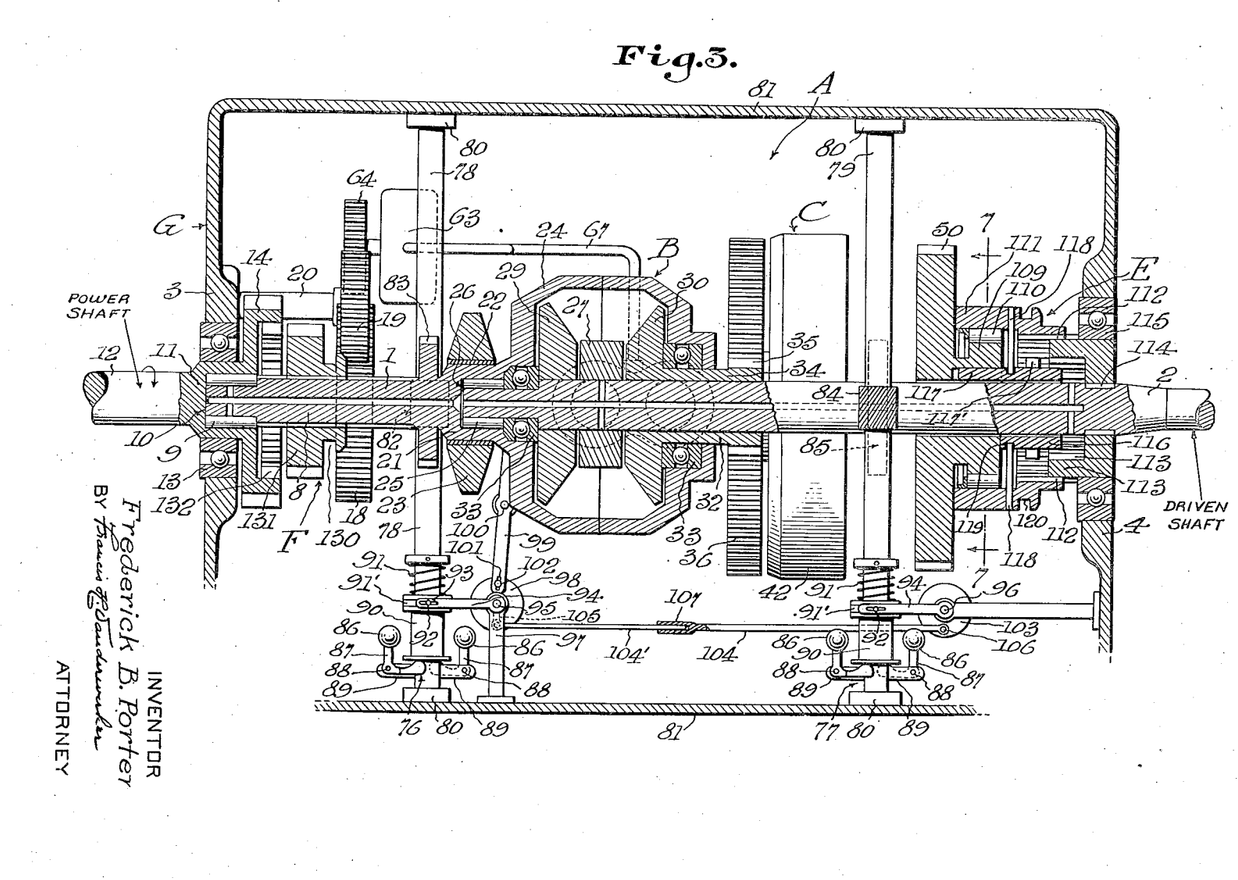
Fig. 3 is a fragmentary sectional view partly in elevation of the improved transmission and housing taken on the line 3—3 of Fig. 1.

The drive shaft 1 and the driven shaft 2 are disposed longitudinally of the transmission housing G and as best shown in Figs. 1 and 3, the drive shaft has its front end 8 mounted on bearings 9 provided in a bore 10 formed on the rear end 11 of a power driven shaft 12, which is rotatably mounted in a bearing 13 provided in the end wall 3 of the housing G and may be the clutch shaft of an engine used in automobiles. The inner end 11 of the power shaft 12 has a ring gear 14 thereon, which forms a part of the direction changing mechanism F. The ring gear 14 of the direction changing mechanism F meshes with an idler gear 15 formed on the front end of a sleeve 16 which is rotatably mounted on a countershaft 17. The sleeve 16 has another idler gear 18 formed on its rear end which meshes with a reversing gear 19 mounted on a shaft 20 which is suitably mounted at one end to the end wall 3 of the housing G, as illustrated in Figs. 1 and 3.

The rear end 21 of the drive shaft 1 is journaled at 22 in a transverse frame member 23, and has an integral casing or drum 24 formed thereon for the differential gear drive mechanism B. The front end of the driven shaft 2 is rotatably mounted in a bearing 25 provided in a bore 26 formed in the rear end 21 of the drive shaft 1 and is adapted to be directly coupled to the rear wheels of a vehicle through a propeller shaft and rear axle assembly (not shown). The casing 24 for the differential gear drive mechanism B is provided with a spider 27 which has differential cone-shaped gears or pinions 28, rotatably mounted thereon, which gears 28 are adapted to mesh with side bevel gears 29 and 30. The side gear 29 is keyed at 31 to the driven shaft 2 and the side gear 30 is formed on one end of a sleeve 32, which is rotatably mounted on the driven shaft 2. Bearing 33 is provided for rotatably supporting the casing 24 on the driven shaft 2 and on the sleeve 32 of the side gear 30. The rear end 34 of the sleeve 32 extends outwardly from the rear end of the casing 24 and has a small gear 35 thereon, which meshes with a large gear 36 of the planetary gear assembly C. The gear 36 is rotatably mounted on the countershaft 17 which extends longitudinally of the housing G, parallel with and beneath the drive shaft 1, and driven shaft 2. The ends 37 and 38 of the countershaft 17 are journaled in bearings 39 provided in the end walls 3 and 4 of the housing G and the countershaft is also journaled at 40 in the transverse frame member 23. A sleeve 41 projects from the front side of the gear 36 and an integral open-ended drum 42, carrying planetary gears 43 projects from the rear side thereof. The planetary gears 43 are rotatably mounted on pins 44 fixedly secured at one end to the drum 42 and mesh with an orbit gear 45 which is keyed at 46 to the countershaft 17. The planetary gears 43 also mesh with a sun gear 47 provided on the front end of a sleeve 48 which is rotatably mounted on the rear end of the countershaft 17. A gear 49 is provided on the rear end of the sleeve 48, which gear 49 meshes with a gear 50 of the free wheeling unit E.

An eccentric 51 forming a portion of the fluid displaced mechanism D is keyed at 52 to the countershaft 17, and is mounted in a strap 53 having a connecting rod 54 extending downwardly therefrom, which is pivotally connected at its lower end to a piston 55 operating in a cylinder 56 formed in one side of a cylinder block 57. The cylinder block 57 is formed integrally with the lower wall 5 of the transmission housing G and extends vertically upward therefrom into the sump or basin 7 of the housing. Another eccentric 57' is splined at 58 to the sleeve 41 of the gear 36 and is also mounted in a strap 59 having a connecting rod 60 extending downwardly therefrom, which is pivotally connected at its lower end to a piston 61 operating in a cylinder 62 formed in the other side of the cylinder block 57 adjacent to the cylinder 56.

Figure 2:
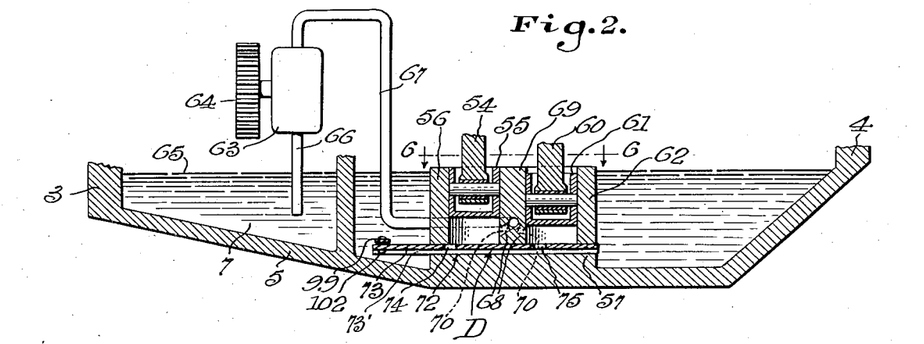
Fig. 2 is a fragmentary vertical sectional view, partly in elevation of a portion of a fluid controlled mechanism on the lower portion of the transmission housing used in carrying out the invention.

Fluid such as oil is contained within the sump 7 of the housing G for coacting with the pistons 55 and 61 in the cylinders 56 and 62 respectively, of the fluid displacing mechanism D, as more particularly illustrated in Figs. 1 and 2. The oil is introduced into the cylinders 56 and 62 by means of a gear type of fluid pump 63, which is driven by a gear 64 meshing with the idler gear 18 of the direction changing mechanism F. The pump 63 draws the oil 65 from the sump or basin 7 of the housing G, by means of an inlet pipe 66 and forces the oil through a supply or outlet pipe 67, to passageways 68 formed in the dividing wall 69 of the cylinder block 57 and having check valves 70 mounted therein of any suitable type to prevent the oil in the cylinders from returning back into the supply pipe 67. The oil is then caused to enter the cylinders 56 and 62 through the passageways 68 which lead into the lower end of each cylinder. In order to permit the oil which has entered the cylinders 56 and 62 to be ejected or displaced therefrom by the pistons 55 and 61 for a purpose which will hereinafter appear, a longitudinal extending slot 72 is provided in the cylinder block 57 adjacent to the lower end of the cylinders and a slide valve 73 in the form of a channel iron containing apertures or holes 74 and 75 is movably mounted in the slot 72.

Figure 4:
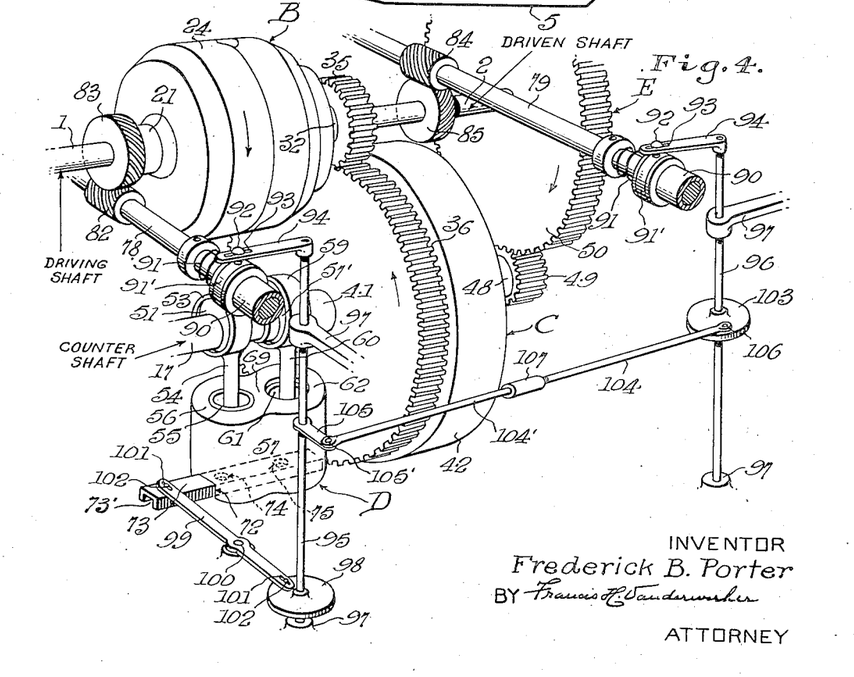
Fig. 4 is a fragmentary perspective view of a portion of the transmission including a mechanism for operating a slide valve used on the fluid controlled mechanism.
Figure 5:
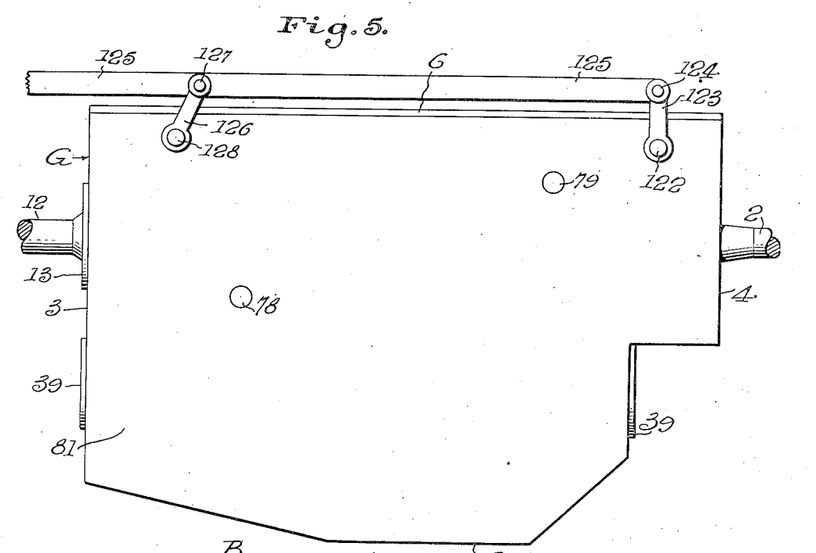
Fig. 5 is a side elevation of the housing for the improved transmission and illustrating a manually operated bar positioned without the transmission housing for cutting out a free wheeling unit when the transmission is operated in a reverse direction.
Figure 6:
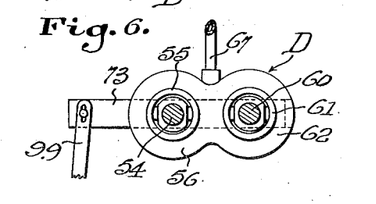
Fig. 6 is a fragmentary cross-sectional view of a portion of the fluid controlled mechanism taken on the line 6—6 of Fig. 2.

The slide valve 73 is operated by means of a governor actuated mechanism comprising two fly ball governors 76 and 77 mounted on one of the ends of transversely extending shafts 78 and 79 respectively, which are rotatably mounted at their ends in bearing supports 80 fixed to the side walls 81 of the housing G, as illustrated in Fig. 3. Referring more particularly to Fig. 4 the governor shaft 78 has a worm gear 82 mounted thereon, which meshes with a worm wheel 83 provided on the drive shaft 1 and the governor shaft 79 is provided with a worm gear 84, which meshes with a worm wheel 85 mounted on the driven shaft 2. The balls or weights 86 of the governors 76 and 77 are mounted on one end of arms 87, which are pivoted at 88 to brackets 89 fixed to the shafts 78 and 79. The inner ends of the arms 87 are adapted to actuate sleeves 90, slidably mounted on the shafts 78 and 79 against the action of coil springs 91. The sleeves 90 are provided with collars 91', having pins 92 thereon, which engage in elongated slots 93 formed in one end of levers 94, whereby the levers are pivotally and slidably connected at one end to the collars 91' on the sleeves 90. The other ends of the levers 94 are mounted on the upper ends of vertical shafts 95 and 96, which are rotatably mounted at their lower ends in portions 97 of the housing G, as illustrated in Fig. 4. The shafts 95 and 96 are rotatably mounted in supporting arms 97 which are suitably mounted at one end to a side wall 81 and end wall 4 of the housing G, as illustrated in Fig. 3.

A disk 98 is fixedly mounted on the lower end of the shaft 95 and is operatively connected to the slide valve 73 by means of a lever 99. The lever 99 is pivoted at 100 to a portion of the housing G and is provided with longitudinally extending slots 101 at its ends, which slots 101 are engaged by pins 102 mounted on the disk 98 and on one end of the slide valve 73. A disk 103 is fixedly mounted on the shaft 96 intermediate the ends thereof and is operatively connected to the shaft 95 by means of a pair of rods 104 and 104' and lever 105. One end of the rod 104 is pivoted at 106 to the disc 103 and has a socket member 107 on its other end in which one end of the rod 104' is slidably mounted. The other end of the rod 104' is pivoted at 105' to one end of the lever 105, which is fixedly secured at its other end to the shaft 95.

Figure 7:
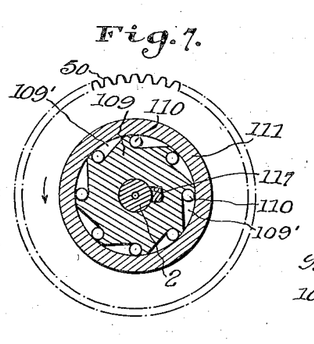
Fig. 7 is a cross-sectional view through a free wheeling unit taken on the line 7—7 of Fig. 3, and Figs. 8 and 9 are fragmentary sectional views of the slide valve illustrated in Fig. 2, in different operative positions beneath a pair of cylinders.

The gear 50 of the free wheeling unit E is rotatably mounted on the rear end of the driven shaft 2, and has a flange 109 formed thereon having wedge-shaped grooves 109' containing rollers 110, as more particularly illustrated in Fig. 7. Surrounding the flange 109 on the gear 50 is a driven ring member 111 which is adapted to be engaged by the rollers 110 to lock the driven member 111 with the gear 50 and also to unlock it therefrom when the gear 50 rotates in certain directions. The driven member 111 is slidably splined at 112 to a flanged ring 113 which in turn is splined at 114 at its rear end to the driven shaft 2 and journaled in a bearing 115 provided on the rear wall 4 of the housing G. A sleeve 116 which is rotatably mounted on the driven shaft 2 is slidably splined at 117 (see Fig. 3) to the gear 50 and has teeth 117' thereon for slidable engagement with teeth 113' on the flanged ring 113. The sleeve 116 is connected with the driven member 111 by means of fingers 118 which engage in a circumferential groove 119 formed in the sleeve. The driven member 111 has a circumferential groove 120 formed therein which is engaged by the lower end of a fork 121, which fork 121 is fixedly mounted at its upper end on a shaft 122 which is partially rotated by means of a lever 123. The lever 123 is pivotally connected at 124 to the rear end of a manually operated bar 125, operatively positioned without the housing G and extending toward the front end of the transmission. One end of a lever 126 is pivotally connected at 127 to the bar 125 and is secured at its other end to a shaft 128. A fork 129 is fixedly connected at its upper end to the shaft 128 and engages in a groove 130 formed in a sliding gear 131 of the direction changing mechanism F. The gear 131 of the direction changing mechanism F is slidably splined to the drive shaft 1 and is adapted to be actuated by the fork 129 into mesh with teeth 132 formed on the inner surface of the ring gear 14 of the power shaft 12 for driving the shaft 1 in one direction or to be moved into mesh with the reversing gear 19 for driving the drive shaft 1 in another direction.

In operation, assuming that the power shaft 12 of the motor or engine by which it is driven to be rotating at idling speed in a clockwise direction as indicated by the arrow, looking from the front of the transmission to the rear and that the sliding gear 131 of the direction changing machanism F has been moved into mesh with the teeth 132 on the ring gear 14, thereby causing the drive shaft 1 to be driven in the same direction as the power shaft 12. Upon rotation of the drive shaft 1, the casing 24 of the differential gear drive mechanism B is rotated in a clockwise direction, thus tending to rotate the pinions 28 and the side gears 29 and 30 in the same direction. Should the vehicle on which the transmission is mounted be standing still, the side gear 29 cannot be rotated by the pinions 28, as it is keyed at 31 to the front end of the driven shaft 2, which is adapted to be coupled directly at its rear end with the rear axle driving unit (not shown) of the vehicle. The pinions 28 are thus caused to move with the casing 24 in a clockwise direction, but rotate in a counterclockwise direction. Since the side gear 29 on the driven shaft 2 cannot move, the pinions 28 will rotate the side gear 30 in a clockwise direction, thus rotating the gear 34 on the sleeve 32 of the side gear 30 in the same direction, which in turn rotates the large gear 36 including the drum 42 of the planetary gear assembly C, in a counterclockwise direction. As the gear 36 is rotated the planetary gears 43 mounted on the drum 42 and meshing with the orbit gear 45 and the sun gear 47, drives the sun gear 47 in a counterclockwise direction which in turn drives the gear 49 on the rear end of the sleeve 48 in the same direction.

The rotation of the orbit gear 45 is retarded or stopped in a manner to be hereinafter described, and the drum 42 carrying the planetary gears 43 will, as it rotates, drive the planetary gears against the orbit gear 45. The gear 49 drives the gear 50 of the free wheeling unit E in a clockwise direction as indicated by the arrow in Fig. 7. As the gear 50 is rotated, the rollers 110 on the flange 109 of the gear 50 move in the wedge-shaped grooves 109' and engage with the ring member 111, thereby frictionally coupling the ring member 111 to the gear 50 and causing the ring member to rotate in the same direction as gear 50. The ring member 111 being slidably splined at 112 to the flange ring 113, which in turn is splined at 114 to the driven shaft 2 rotates the flange ring 113 in a clockwise direction on the bearings 115 provided in the rear wall 4 of the housing G, thus causing the driven shaft 2 to be rotated in the same direction as the drive shaft 1.

The ring gear 14 of the direction changing mechanism F drives the idler gear 15, which in turn drives the idler gear 18, which drives the reversing gear 19 and also the gear 64 for the fluid pump 63. The pump 63 draws the oil 65 up from the sump 7 in the housing G, through the inlet pipe 66 and delivers the oil through the pipe 67 to the passageways 68, containing the check valves 70, in the dividing wall 69 of the cylinder block 57. The oil then passes through the passageways 68 and enters the bottom of the cylinders 56 and 62. The pistons 55 and 61 on the eccentrics 51 and 57' respectively are adapted to force the oil out of the cylinders 56 and 62 through the apertures 74 and 75 provided in the slide valve 73. The oil then passes through the channel 73' formed by the slide valve construction and again enters the sump 7. The apertures 74 and 75 are so spaced on the slide valve 73 that the aperture 74 is adapted to control the oil forced out of the cylinder 56 by the piston 55 and the aperture 75 is adapted to control the oil forced out of the cylinder 62 by the piston 61.

Upon the rotation of the drive shaft 1 and driven shaft 2, the worm wheels 83 and 85 mounted thereon drive the worm gears 82 and 84 mouned on the governor shafts 78 and 79 respectively, thereby causing the governors 76 and 77 to be operated to force the sleeves 90 thereof inwardly, thus causing the levers 94 to partially rotate the shafts 95 and 96 and the disks 98 and 103 respectively mounted thereon. At low gear, upon the actuation of the disk 98 on the shaft 95, the lever 99 is actuated on its pivot 100 and pulls the slide valve 73 outwardly and moves the aperture 74 beneath the bottom of the cylinder 56, to such a position as to restrict the oil from being forced out of the cylinder 56 by the piston 55 and the aperture 75 in the slide valve 73 is moved to a position as to permit the oil in the cylinder 62 to freely pass therethrough and forced out of the cylinder by the piston 61. The governor 76 is called the drive governor and governor 77 is called the coast governor. The coast governor 77 is adapted to actuate the slide valve 73 through its lever 94, shaft 96, disk 103, arm 104, slidable coupling 107, arm 104' and lever 105 connected to the shaft 95, on which the disk 98 is mounted when a vehicle is coasting and is set to quickly move the slide valve 73 for moving the aperture 74 therein to such a position as to restrict the oil forced out of the cylinder 56 by the piston 55, with the aperture 75 in the slide valve moved to such a position as to permit the oil in the cylinder 67 to pass freely therethrough when acted on by the piston 61. Even though the governors 76 and 77 are linked together, their connection is sufficiently flexible as to allow independent action by either governor. The eccentric 51 which is connected at 52 to the countershaft 17 is adapted to actuate the piston 55 in the cylinder 56 and the eccentric 57' keyed at 58 to the sleeve 41 of the gear 36 is adapted to actuate the piston 61 in the cylinder 62.

Figure 8:
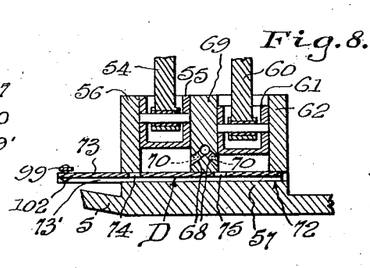
Figure 9:
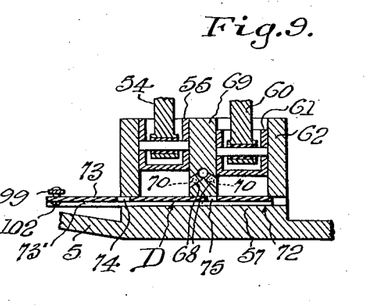

By moving the slide valve 73 a distance as to place the aperture 74 in a position beneath the cylinder 56 to restrict the amount of oil adapted to pass therethrough, with the aperture 75 placed in a position beneath the cylinder 62 to permit the oil in the cylinder to flow freely therethrough, the movement of the piston 55 in the cylinder 56 is slowed down, thus slowing down the rotation of the countershaft 17 and hence the orbit gear 45 of the planetary gear assembly C, which is splined at 46 to the countershaft. Should the speed of rotation of the drive shaft 1 be increased, through the power shaft 12, the drive governor 76 will be operated to move the slide valve 73, through its connections with the governor, a sufficient distance as to move the aperture 74 from beneath the cylinder 56, as illustrated in Fig. 8, with the aperture 75 moved to a position as to restrict the flow of the oil out of the cylinder 56 thus stopping any rotation of the countershaft 17 and orbit gear 45, and slowing down the movement of the piston 61 in the cylinder 62 which in turn slows down the movement of the gear 36 including the drum 42 having the planetary gears 43 thereon through the sleeve 41. Upon a greater increase of speed of rotation of the drive shaft 1, the drive governor 76 will be operated a greater amount to move the slide valve 73, a greater distance out from the cylinder block 57 to thus move the apertures 74 and 75 to a position from beneath the cylinders, as illustrated in Fig. 9. If the speed of rotation of the gear 36 is reduced in velocity, the speed of rotation of the gear 35 and the side gear 30 on the sleeve 32 are reduced in velocity.

There is a large gear reduction between the small gear 35 on the sleeve 32 of the differential gear drive mechanism B and the large gear 36 of the planetary gear assembly C, so that the gear 35 will drive gear 36. In starting a vehicle from rest, it will be necessary for the low gear ratio that the aperture 74 in the slide valve 73 be in a position to restrict the flow of the oil out of the cylinder 56, thereby permitting the piston 55 to have some movement in its cylinder and allowing some rotation of the countershaft 17 and orbit gear 45 whereby the planetary gears 43 will be adapted to drive the orbit gear 45. This retarding effect on the orbit gear 45 will increase gradually as the slide valve 73 is operated by the governor 76 to move the aperture 74 from beneath the cylinder 56, so that by the time the vehicle on which the transmission is mounted is traveling at substantially 15 miles per hour, the orbit gear 45 will be locked in a nonrotative position. The gear reduction through the transmission in low gear may be any amount, but in the present instance the gear reduction through the differential gear drive mechanism B is two to one, gears 35 and 36, two to six planetary gears 43 and the sun gear 47, one and three-tenths to one and the gear 49 and gear 50 of the free wheeling unit E, two to six. The final reduction in low gear would therefore be in this case three to one.

As previously stated, the slide valve 73 will be operated by the drive governor 76 to move the aperture 74 to the position illustrated in Fig. 8, for completely closing the bottom of the cylinder 56 and trapping the oil therein, whereby the piston 55 is prevented from moving in the cylinder by the trapped oil. As the movement of the piston 55 is stopped, the countershaft 17 is prevented from rotating and hence the orbit gear 45 is locked in a nonrotative position when the vehicle is traveling at a speed substantially 15 miles per hour. As the orbit gear 45 slows down the planetary gears 43 will drive the sun gear 47 faster and faster so that the velocity loss due to the planetary gears 43 slowing down, will allow a final gear ratio of for instance, two to one. For speeds above substantially 15 miles per hour, the planetary gear assembly C and the free wheeling unit E may move but do not effect the velocity of the driven shaft 2.

As the speed of rotation of the drive shaft 1 is increased the slide valve 73 is moved by the drive governor 76 a sufficient distance as to place the opening 75 in such a position as to restrict the oil in the cylinder 62 from passing therethrough, thus slowing down the movement of the piston 61, which, through the eccentric 57' retards the rotation of the sleeve 41 and hence the rotation of the gear 36, drum 42 and planetary gears 43 more and more, so that by the time the vehicle is traveling at a speed substantially twenty-five miles per hour, the small gear 35, large gear 36 and the driven shaft 2, will have the same velocity. Gear ratios are of course those limited to the side gear 30 and the differential pinions 28 which have a ratio of one to one.

As the speed of the vehicle continues to increase beyond a speed of substantially twenty-five miles per hour, the gear 36 of the planetary gear assembly C will be retarded more and more, thereby slowing down the side gear 30 of the differential gear drive mechanism B, and gear 35 with the pinions 28 traveling on the side gear 30 and driving the side gear 29 so that the side gear 29 on the driven shaft 2 will continue to increase in speed due to differential action and producing a direct drive through the drive shaft 1 and driven shaft 2 at high speed. The maximum overdrive in this case will be substantially one and four-tenths to one. Due to the differential action of the differential gear drive mechanism B, as the driven shaft 2 starts to move by means of the pinions 28 driving the side gear 29, the speed of rotation of the sleeve 32 of the side gear 30 is decreased so that for each variation in the velocity of either the driven shaft 2 or the sleeve 32, there is a corresponding change in the velocity of the driven shaft 2 and the sleeve 32.

To operate the transmission in reverse, the bar 125 is moved in a forward direction, whereby the lower ends of the forks 121 and 130 for the free wheeling unit E and direction changing mechanism F respectively, are moved in a rearward direction. The fork 121 for the free wheeling unit E actuates the ring member 111 rearwardly on the flange ring 113 and as the sleeve 116 is connected by the fingers 118 to the ring member 111, the sleeve is also moved rearwardly with the ring member, with the teeth 117' on the sleeve meshing with the teeth 113' on the flange ring 113, whereby the free wheeling unit is cut out. The free wheeling unit F allows a flexible means for power to be delivered to the driven shaft 2 for all of the low gear ratios. The fork 129 of the direction changing mechanism F actuates the sliding gear 131 which is illustrated as being in neutral, to the rear for meshing with the reversing gear 19, which rotates the idling gear 18 and hence the idling gear 15 in a reverse direction, thus rotating the drive shaft 1 through the ring gear 14 in a reverse direction. The gear ratios for reversing the transmission are the same as those for low gear.

It will thus be seen that there is herein provided a novel and useful form of a continuous type of variable power transmission which is well adapted for all the purposes indicated. Even though there is herein shown and described certain features of construction and operation of parts, it is nevertheless to be understood that various changes may be made therein, if the claims do not depart from the spirit or scope of the invention.

Having described my invention, what I claim as new and wish to secure by Letters Patent is:

1. A variable ratio transmission including a driving member and a driven member in axial alinement, a countershaft, differential gear mechanism connecting said driving and driven members, a planetary gear assembly mounted on and adapted to rotate said countershaft, said planetary gear assembly including a gear meshing with said differential gear mechanism, a drum having planetary gears mounted thereon carried by said first-mentioned gear of the planetary gear assembly, said planetary gears on said drum connected to drive said driven member, and a fluid displacing means operative as a brake for controlling the rotation of the counter-shaft and operation of said planetary gear assembly.

2. A variable ratio transmission including a driving member and a driven member in axial alinement, a countershaft, differential gear mechanism connecting said driving and driven members, a planetary gear assembly mounted on and adapted to rotate said countershaft, said planetary gear assembly including a gear meshing with said differential gear mechanism, a drum having planetary gears mounted thereon carried by said first-mentioned gear of the planetary gear assembly, said planetary gears on said drum connected to drive said driven member, a fluid displacing means operative as a brake for controlling the rotation of the countershaft and operation of said planetary gear assembly and means supplying fluid to said fluid displacing means.

3. A variable ratio transmission including a driving member and a driven member in axial alinement, a countershaft, differential gear mechanism connecting said driving and driven members, a planetary gear assembly mounted on and adapted to rotate said countershaft, said planetary gear assembly including a gear meshing with said differential gear mechanism, a drum having planetary gears mounted thereon carried by said first-mentioned gear of the planetary gear assembly, said planetary gears on said drum connected to drive said driven member, a fluid displacing means operative as a brake for controlling the rotation of the countershaft and operation of said planetary gear assembly, means supplying fluid to said fluid displacing means, and means operated by said planetary gear assembly for displacing said fluid from said fluid displacing means.

4. A variable ratio transmission including a driving member and a driven member in axial alinement, a countershaft, differential gear mechanism connecting said driving and driven members, a planetary gear assembly mounted on and adapted to rotate said countershaft, said planetary gear assembly including a gear meshing with said differential gear mechanism, a drum having planetary gears mounted thereon carried by said first-mentioned gear of the planetary gear assembly, said planetary gears on said drum connected to drive said driven member, a fluid displacing means operative as a brake for controlling said planetary gear assembly, means supplying fluid to said fluid displacing means, means operated by said planetary gear assembly for displacing said fluid from said fluid displacing means, and means operated to control the amount of fluid displaced by said third mentioned means, whereby the braking action of said fluid displacing means is increased or decreased for controlling the operation of said planetary gear assembly.

5. A variable ratio transmission including a driving member and a driven member in axial alinement, a countershaft, differential gear mechanism connecting said driving and driven members, a planetary gear assembly mounted on and adapted to rotate said countershaft, said planetary gear assembly including a gear meshing with said differential gear mechanism, a drum having planetary gears mounted thereon carried by said first-mentioned gear of the planetary gear assembly, said planetary gears on said drum connected to drive said driven member, a fluid displacing means operative as a brake for controlling the rotation of the countershaft and operation of said planetary gear assembly, means supplying fluid to said fluid displacing means, means operated by said planetary gear assembly for displacing the fluid from said fluid displacing means, means operated to control the amount of fluid displaced from said fluid displacing means and means operated to control the operation of said last mentioned means, whereby the braking action of said fluid displacing means is increased or decreased for controlling the operation of said planetary gear assembly.

6. A variable ratio transmission including a driving member, a driven member, differential gear mechanism connecting said members, a planetary gear assembly including a gear meshing with said differential gear mechanism, a drum having planetary gears mounted thereon carried by said first-mentioned gear of the planetary gear assembly, said planetary gears on said drum connected to drive said driven member, a fluid displacing means operative as a brake for controlling said planetary gear assembly, means supplying fluid to said fluid displacing means, means operated to displace the fluid from said fluid displacing means, means operated to control the amount of fluid displaced from said fluid displacing means and a governor actuated mechanism connected to control the operation of said last mentioned means, whereby the braking action of said fluid displacing means is increased or decreased for controlling the operation of said planetary gear assembly.

7. A variable ratio transmission including a driving member, a driven member, a third member, differential gear mechanism connecting said driving member and driven members, a planetary gear assembly connected to said differential gear mechanism and to said driven member, said planetary gear assembly including a part rotatably mounted on said third member, and a part fixedly secured thereto, said parts of said planetary gear assembly revoluble relative to each other, a fluid displacing means operative as a brake for controlling said planetary gear assembly, said fluid displacing means including cylinders having pistons operating therein, one of said pistons connected to be operated by said third member, and another of said pistons connected to be operated by said first mentioned part of said planetary gear assembly, means supplying fluid to said cylinders, said pistons operated by said parts of said planetary gear assembly including said third member for displacing the fluid in said cylinders, and means operated to control the amount of fluid displaced by said pistons, whereby the braking action of said fluid displacing means is increased or decreased for controlling the operation of said planetary gear assembly.

8. A variable ratio transmission including a driving member and a driven member in axial alinement, a counter-shaft, differential gear mechanism connecting said driving and driven members and including an auxiliary gear driven by said differential gear mechanism, a planetary gear assembly mounted on and adapted to rotate said counter-shaft, said planetary gear assembly including a gear meshing with the auxiliary gear of said differential gear mechanism, a drum having planetary gears mounted thereon carried by said first-mentioned gear of the planetary gear assembly, said planetary gears on said drum connected to drive said driven member and a fluid displacement means operative as a brake for controlling the rotation of the counter-shaft and operation of said planetary gear assembly.

9. A variable ratio transmission including a driving member, a driven member, a third member, differential gear mechanism connecting said driving member and driven members, a planetary gear assembly mounted on said third member and connected to said differential gear mechanism and to said driven member, said planetary gear assembly including a part rotatably mounted on said third member, and a part fixedly secured to said third member, said parts of said planetary gear assembly revoluble relative to each other, a fluid displacing means operative as a brake for controlling the operation of said parts of said planetary gear assembly, said fluid displacing means including cylinders having pistons operating therein, one of said pistons connected to be operated by said third member and another of said pistons connected to be operated by said first mentioned part of said planetary gear assembly, means supplying fluid to said cylinders, said pistons adapted to displace the fluid in said cylinders, means operated to control the amount of fluid displaced by said pistons from said cylinders, whereby the braking action of said fluid displacing means is increased or decreased for controlling the operation of each of said parts of said planetary gear assembly including said third member, and means connected to be operated by said driving shaft for controlling the operation of said third mentioned means.

10. A variable ratio transmission including a driving member, a driven member, a third member, differential gear mechanism connecting said driving member and driven members, a planetary gear assembly mounted on said third member and connected to said differential gear mechanism and to said driven shaft, said planetary gear assembly including a part rotatably mounted on said third member and a part fixedly secured to said third member, said parts of said planetary gear assembly revoluble relative to each other, a fluid displacing means operative as a brake for controlling the operation of said planetary gear assembly, said fluid displacing means including cylinders having pistons operating therein, one of said pistons connected to be operated by said third member and another of said pistons connected to be operated by said first mentioned part of said planetary gear assembly, means supplying fluid to said cylinders, said pistons adapted to displace the fluid in said cylinders, and a valve operated to control the amount of fluid displaced by said pistons from said cylinders, whereby the braking action of said fluid displacing means is increased or decreased for controlling the operation of each of the parts of said planetary gear assembly including said third member.

11. A variable ratio transmission including a driving member, a driven member, differential gear mechanism connecting said members, and including an auxiliary gear driven by said differential gear mechanism, a planetary gear assembly including a gear meshing with the auxiliary gear of said differential gear mechanism, a drum having planetary gears mounted thereon carried by said first mentioned gear of said planetary gear assembly unit, a free wheeling unit connected to be driven by said planetary gears of said planetary gear assembly and connecting said planetary gear assembly with said driven shaft, and a fluid displacing means operative as a brake for controlling the operation of said planetary gear assembly.

12. A variable ratio transmission including a driving member, a driven member, differential gear mechanism connecting said members and including an auxiliary gear driven by said differential gear mechanism, a planetary gear assembly including a gear meshing with the auxiliary gear of said differential gear mechanism, a drum having planetary gears mounted thereon carried by said first mentioned gear of the planetary gear assembly, a member driven by said planetary gears, a free wheeling unit connected to be operated by said last mentioned member and including a part fixed to said driven member, and a fluid displacing means operative as a brake for controlling the operation of said planetary gear assembly.

13. A variable ratio transmission including a driving member, a driven member, differential gear mechanism connecting said members and including an auxiliary gear driven by said differential gear mechanism, a planetary gear assembly including a gear meshing with the auxiliary gear of said differential gear mechanism, a free wheeling unit including a part fixed to said driven member and a part connected to be driven by said planetary gear assembly, means operated for disconnecting said last mentioned part of the free wheeling unit from said planetary gear assembly, and a fluid displacing means operative as a brake for controlling the operation of said planetary gear assembly.

14. A variable ratio transmission including a driving member, a driven member, a third member, differential gear mechanism connecting said driving member and driven members, a planetary gear assembly connected to said differential gear mechanism and including a part rotatably mounted on said third member, an orbit gear fixedly secured to said third member, a drum having planetary gears thereon carried by the said part of said planetary gear assembly, said part of said planetary gear assembly including said planetary gears revoluble relative to said orbit gear, said planetary gears adapted to drive said orbit gear for revolving said third member.

a free wheeling unit having a part fixed to said driven member and another part connected to be driven by said planetary gears, and a fluid displacing means operative as a brake for controlling the operation of said part of said planetary gear assembly including said planetary gears, orbit gear and said third member.

15. A variable ratio transmission including a driving member, a driven member, a third member, differential gear mechanism connecting said driving member and driven members, a planetary gear assembly mounted on said third member and connected to said differential gear mechanism and to said driven shaft, said planetary gear assembly including a part rotatably mounted on said third member and a part fixedly secured to said third member, said parts of said planetary gear assembly revoluble relative to each other, a fluid displacing means operative as a brake for controlling the operation of said planetary gear assembly, said fluid displacing means including cylinders having pistons operating therein, one of said pistons connected to be operated by said third member, and another of said pistons connected to be operated by said first mentioned part of said planetary gear assembly, means supplying fluid to said cylinders, said pistons adapted to displace the fluid in said cylinders, a valve slidably mounted on said cylinders and having openings provided therein, and a governor actuated mechanism operated by said driving shaft and driven shaft for controlling the operation of said valve on said cylinders, said openings in said valve adapted to restrict the fluid displaced by said pistons from said cylinders upon the operation of said valve, whereby the braking action of said fluid displacing means is increased or decreased for controlling the operation of said parts of said planetary gear assembly including said third member.

16. A variable ratio transmission including a driving member, a driven member, differential gear mechanism connecting said members, a planetary gear assembly connected to said differential gear mechanism and to said driven member, a fluid displacing means operative as a brake for controlling the operation of said planetary gear assembly, means supplying fluid to said fluid displacing means, means operated by said planetary gear assembly for displacing the fluid supplied to said cylinders, means controlling the amount of fluid displaced by said third mentioned means, whereby the braking action of said fluid displacing means is increased or decreased for controlling said planetary gear assembly, said last mentioned means including a valve, a drive governor connected to be operated by said driving member, means connecting said drive governor to said valve, and a coast governor connected to be operated by said driven shaft, said coast governor also connected to actuate said valve.

17. A variable ratio transmission including a driving member, a driven member, a third member, differential gearing connecting said driving member and driven members, a planetary gear assembly including a part connected to be driven by said differential gear mechanism, and a part fixed to said third member, said parts revoluble relative to each other, said first mentioned part of said planetary gear assembly adapted to drive said second mentioned part and connected to drive said driven shaft, and a fluid displacing means operative as a brake for controlling the operation of said planetary gear assembly, said fluid displacing means including cylinders having pistons operating therein, an eccentric mounted on said third member and connected to operate one of said pistons in one of said cylinders, and another eccentric mounted on said first mentioned part of said planetary gear assembly, said last mentioned eccentric connected to operate another of said pistons in another of said cylinders.

18. A variable ratio transmission including a driving member, a driven member, a third member, differential gearing connecting said driving member and driven members and including an auxiliary gear driven by said differential gearing, a planetary gear assembly including a gear meshing with said auxiliary gear, a drum having planetary gears thereon carried by said first mentioned gear of said planetary gear assembly, an orbit gear fixed to said third member, said planetary gears connected to drive said driven member and adapted to drive said orbit gear for operating said third member, and a fluid displacing means operative as a brake for controlling the operation of said planetary gear assembly, said fluid displacing means including a part operated by said first mentioned gear of said planetary gear assembly, and a part operated by said third member.

19. A variable ratio transmission including a driving member, a driven member, a third member, differential gearing connecting said driving member and driven members, a planetary gear assembly including a part connected to be driven by said differential gear mechanism, and a part fixed to said third member, said parts of said planetary gear assembly revoluble relative to each other, said first mentioned part connected to drive said driven member and adapted to drive said second mentioned part, a fluid displacing means operative as a brake for controlling said planetary gear assembly, said fluid displacing means including cylinders having pistons operating therein, means supplying fluid to said cylinders, an eccentric mounted on said third member and connected to one of said pistons, and an eccentric mounted on said first mentioned part of said planetary gear assembly and connected to another of said pistons, said pistons adapted to be operated in said cylinders by said eccentrics upon the operation of said parts of said planetary gear assembly for displacing the fluid supplied to said cylinders, a valve movably mounted on said cylinders, apertures provided in said valve, one of said apertures adapted to control the amount of fluid displaced from one of said cylinders by one of said pistons, and another of said apertures adapted to control the amount of fluid displaced from another of said cylinders by another of said pistons, and means connected to be actuated by said driving member and driven member for controlling the operation of said valve.

20. A variable ratio transmission including a power driven member, a second member, a change speed mechanism connecting said power driven member and second member, a third member, a differential gear mechanism connecting said second member and third member, a planetary gear assembly connected to said differential gear mechanism and said third member, fluid displacing means operative as a brake for controlling the operation of said planetary gear assembly, and means connected to be actuated by said change speed mechanism for supplying fluid to said fluid displacing means.

21. A variable ratio transmission comprising, in combination, a driving member and a driven member in axial alinement, a counter-shaft, differential gear mechanism connecting said driving and driven members, a planetary gear assembly mounted on and adapted to rotate said counter-shaft, said planetary gear assembly connected to be driven by said differential gear mechanism and connected to drive said second mentioned member, and a fluid displacing means operative as a brake for controlling the rotation of the counter-shaft and operation of said planetary gear assembly.

22. A variable ratio transmission comprising, in combination, a driving member and a driven member in axial alinement, a counter-shaft, differential gear mechanism connecting said driving and driven members, a planetary gear assembly mounted on and adapted to rotate said counter-shaft, said planetary gear assembly connected to drive said second mentioned member and including a gear connected to be driven by said differential gear mechanism, and a fluid displacing means operative as a brake for controlling the rotation of said counter-shaft and operation of said planetary gear assembly.

23. A variable ratio transmission comprising, in combination, a driving member and a driven member in axial alinement, a counter-shaft, differential gear mechanism connecting said driving and driven members, a planetary gear assembly mounted on and adapted to rotate said counter-shaft, said planetary gear assembly including a gear connected to be driven by said differential gear mechanism, and a sun gear connected to drive said driven member, and a fluid displacing means operative as a brake for controlling the rotation of said counter-shaft and operation of said planetary gear assembly.

24. A variable ratio transmission comprising, in combination, a driving member and a driven member in axial alinement, a counter-shaft, differential gear mechanism connecting said driving and driven members and including an auxiliary gear driven by said differential gear mechanism, a planetary gear assembly mounted on and adapted to rotate said counter-shaft, said planetary gear assembly including a gear meshing with said auxiliary gear of the differential gear mechanism and an orbit gear and a sun gear connected to drive said driven member, and a fluid displacing means operative as a brake for controlling the rotation of said counter-shaft and operation of said planetary gear assembly.

25. A variable ratio transmission comprising, in combination, a driving and a driven member in axial alinement, a counter-shaft, differential gear mechanism connecting said driving and driven members, a planetary gear assembly mounted on and adapted to rotate said counter-shaft, said planetary gear assembly including a gear rotatably mounted on said counter-shaft, and a gear fixed to said counter-shaft, said first-mentioned gear of said planetary gear assembly connected to be driven by said differential gear mechanism and connected to drive said driven member, and said second-mentioned gear of the planetary gear assembly connected to be driven by said first-mentioned gear for rotating said counter-shaft, and fluid displacing means operative as a brake for controlling the operation of said first-mentioned gear of the planetary gear assembly by said differential gear mechanism and the rotation of said counter-shaft by said second-mentioned gear of the planetary gear assembly.

FREDERICK BRENTON PORTER.